Jan. 13, 1942.   G. V. SOPER   2,269,832
SEAT CONSTRUCTION
Filed Nov. 30, 1938   2 Sheets-Sheet 1

INVENTOR
Gilbert V. Soper
BY
ATTORNEYS

Jan. 13, 1942. G. V. SOPER 2,269,832
SEAT CONSTRUCTION
Filed Nov. 30, 1938 2 Sheets-Sheet 2
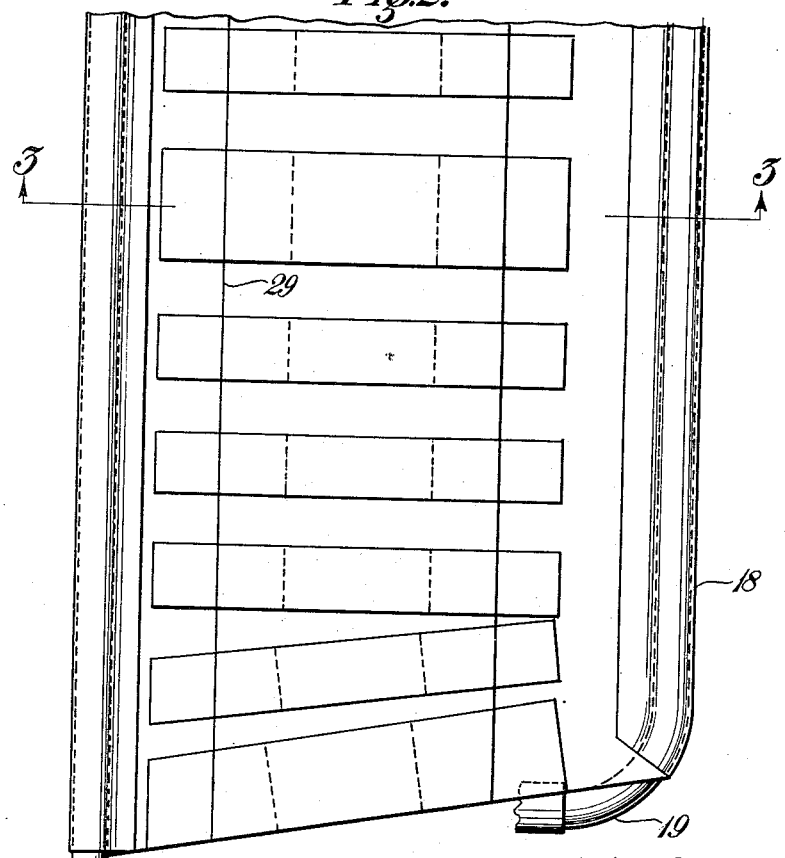
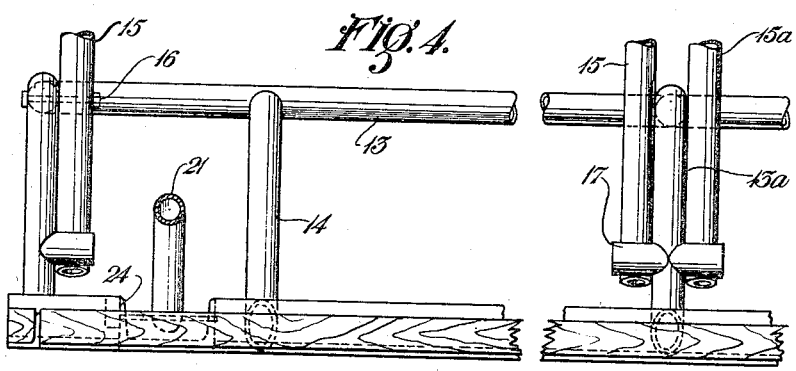
INVENTOR
Gilbert V. Soper
BY Ely & Frye
ATTORNEY Patented Jan. 13, 1942

2,269,832

UNITED STATES PATENT OFFICE 2,269,832

SEAT CONSTRUCTION

Gilbert V. Soper, Akron, Ohio, assignor to The Firestone Tire & Rubber Company, Akron, Ohio, a corporation of Ohio Application November 30, 1938, Serial No. 243,188

1 Claim. (Cl. 155—55)

This invention relates generally to seat constructions, more especially to the seat supports provided for seats.

Heretofore sponge rubber has been proposed for use as the material for forming the supporting cushion in seats. One problem arising from use of sponge rubber is that the volume thereof ordinarily required to provide a comfortable support raises the cost and weight of the seat an undesirable amount.

One object of this invention is to provide a seat support whereby a smaller volume of rubber may be used in the seat cushion, than that heretofore required, without detracting from the favorable supporting properties thereof.

Another object of the invention is to provide a seat having desirable load supporting characteristics, which seat becomes more resistant to deflection after load is applied thereto. The foregoing and other objects will be manifest from the following specification.

Reference is now directed to the accompanying drawings, in which:

Figure 2 is a partial plan view of the seat support of Figure 1 taken on line 2—2 thereof;

Figure 3 is a vertical section taken on line 3—3 of Figure 2; and

Figure 4 is a front elevation of the lower portion of the seat support of Figure 1.

Figure 1:
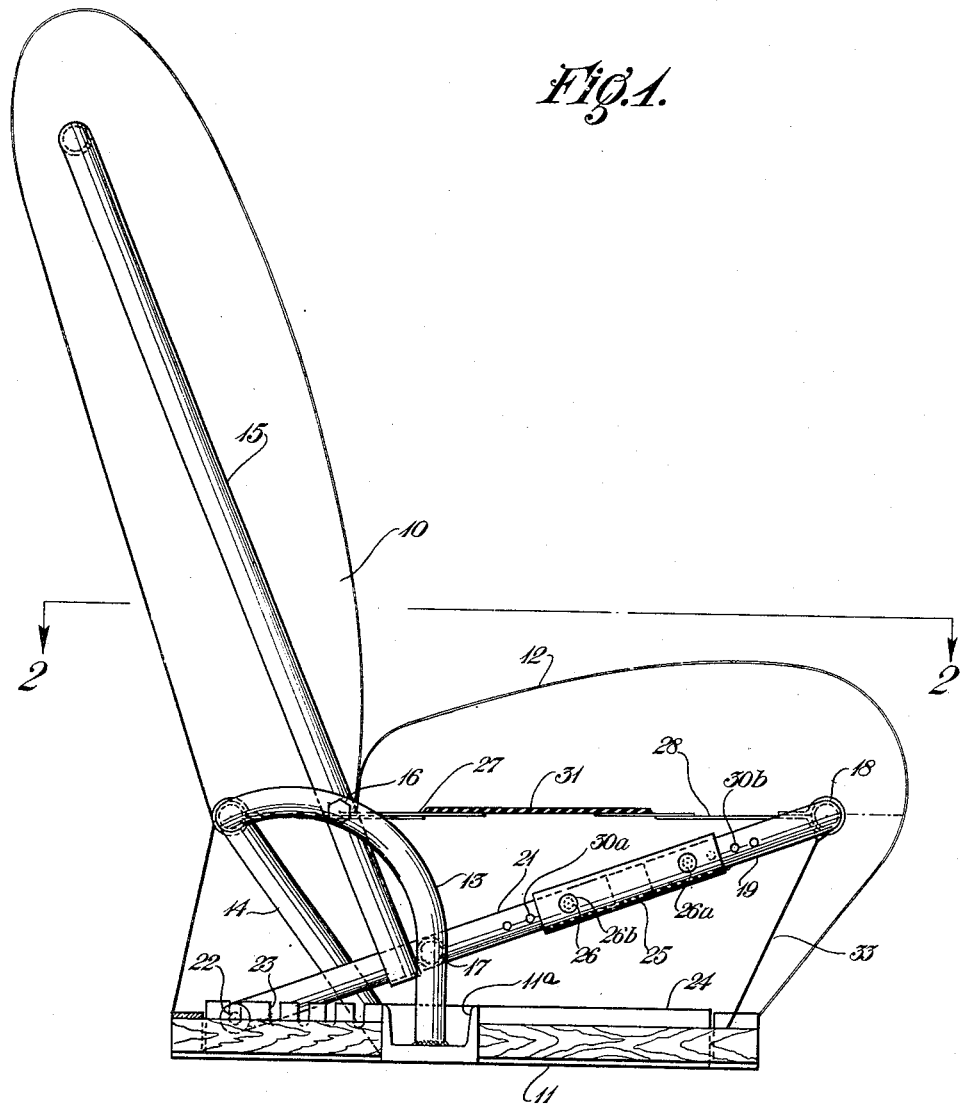
Figure 1 is a side elevation of a seat support of the invention.

In its broadest aspect, the invention consists in supporting the front member of a seat by arms which are pivotally secured adjacent the rear of the seat. A distortable, load-receiving sheet extends between the front member of the seat and means adjacent the rear thereof to provide a ready surface for load application to the seat. The side arms are so positioned that on downward movement of the front member under load, the front member is moved forwardly relative to the rear of the seat so as to increase the tension in the load-receiving sheet whereby its resistance to deflection is increased. This gives desirable load supporting characteristics to the load-receiving sheet since its resistance to deflection is increased when load is applied.

Referring specifically to Figure 1 of the drawings, a seat indicated generally by the numeral 10 is shown carried by a base 11. The lines 12 indicate the general finished outline of the seat. A rear, or anchoring member 13 is provided adjacent the rear of the seat 10 and it is suitably secured to and extends upwardly from a channel 11a secured to the base 11. Tubular braces 14 may extend between the anchored member 13 and the base 11 to strengthen the anchoring member. A substantially inverted U-shaped back frame 15 is pivotally associated with the anchoring member 13 by bolts 16. Small pieces of pipe 17 having recessed ends are secured to, and extend inwardly from, the anchoring member 13 to provide stops for the back frame 15 whereby the rearward movement thereof is limited.

A front member 18, having rearwardly extending end portions 19, is supported by side arms 21 that are pivotally mounted in slots 23, formed in the sides of a channel member 24 carried by the base 11, by a pin 22 extending through holes (not shown) in the ends of the side arms 21. The side arms 21 are connected to the end portions 19 of the front member by sleeves 25 in which both the arms and end portions are slidingly received. This connection permits relative longitudinal movement of the side arms 21 and end portions 19 whereby the apparatus is made adjustable, as hereinafter will appear. Suitable means, such as pins 26, extend through holes in the sleeves 25 and holes 30a and 30b, respectively, in the side arms and end portions 19 to secure the members in fixed relation. The pins 26 carry washers 26a at their ends, both the pins and washers being removably positioned by cotter pins 26b extending through holes in the pins 26.

In order to provide a surface for load application to the seat 10, a load-receiving sheet 27 extends tautly between the anchoring member 13 and the front member 18. This load-receiving sheet may comprise fabric strips 28 and 29 which are suitably secured to the front member 18 and the anchoring member 13, respectively. A plurality of rubber strips 31, compounded to give the desired strength thereto, have fabric strips 32 molded to the ends thereof, which strips 32 are sewed, or otherwise secured, to the fabric strips 28 and 20 whereby a resilient supporting sheet is provided. Other types of supporting sheets obviously may be substituted for the sheet 27, thus a solid sheet of rubber, or a plurality of strips of rubber, or other suitable means may be substituted for that illustrated.

Preferably it is desired to have the supporting sheet 27 under slight tension under no-load conditions. To achieve this result, the upward movement of the front member 18 must be limited in any suitable manner, such as by securing one end of a flexible cable 33 to the front member 18 and securing the other end thereof to the base 11. This cable also functions to prevent the front member 18 and the side arms 21 from moving upwardly on load application to the rear of the supporting sheet 27. In certain instances, the cables 33 may be omitted for the dead weight of the seat 10 may be sufficient to tension the supporting sheet the desired amount, and if a small downwardly directed force be exerted on the front member 18, when the seat is loaded, then the side arms 21 will not be urged upwardly by load on the rear of the sheet 27.

The seat of the invention may be adjusted to suit the particular seat, loads, and supporting sheet with which it is used by varying the position of the pivotal support of the side arms 21. Thus, the channel 24 in which the side arms are mounted has a plurality of spaced slots 23 formed therein, in any of which the side arms may be pivotally mounted. Obviously the side arms 21 and/or the end portions 19 may be inserted farther in or withdrawn slightly from the sleeves 25 to adjust their combined length so that the side arms may be mounted in the desired slots and the proper radius given to the supports for the front member. Thus, the sheet 27 is stretched, or further tensioned by load application since the side arms are fulcrumed, in all cases, so that the front member is moved away from the anchoring member when depressed by load. This increase in tension of the supporting sheet under load is a feature of the invention and naturally makes it more resistant to deflection whereby a load thereon does not produce an undesirable amount of sag therein. Whenever the pivotal point of the side arms 21 is definitely located, then the sleeves 25 may be omitted and the side arms secured to the end portions 19 or the front member in any suitable manner. The side arms 21 may even be integral with the front member 18, if desired.

The embodiment of the invention shown herein provides an individual back support and a common seat support, the part 13a of the anchoring member 13 being the center member of the seat 10, the sides of which are similarly constructed.

While an illustration and a written description of one embodiment of the invention is disclosed herein, it will be understood that various modifications can be made without departing from the scope of the invention as defined in the appended claim.

What is claimed is:

In a seat construction, a base, an anchoring member carried by said base adjacent the rear of the seat, a front member having rearwardly extending end portions, distortable load-receiving means tautly secured between said anchoring member and said front member, means for limiting the upward movement of said front member, side arms pivotally secured to said base adjacent the rear thereof for pivotal movement in a vertical plane and for supporting said front member, sleeves slidingly receiving said side arms and end portions to permit relative longitudinal movement therebetween whereby said front member may be moved forwardly and rearwardly relative to said anchoring member, and means securing said side arms and end portions in said sleeve, said side arms being positioned so that they move said front member forwardly relative to said anchoring member when they are forced downwardly by load whereby the tension in said load-receiving means is increased.

GILBERT V. SOPER.